United States Patent
Zhang et al.

(10) Patent No.: US 12,511,750 B2
(45) Date of Patent: Dec. 30, 2025

(54) IMAGE PROCESSING METHOD AND APPARATUS BASED ON IMAGE PROCESSING MODEL, ELECTRONIC DEVICE, STORAGE MEDIUM, AND COMPUTER PROGRAM PRODUCT

(71) Applicant: Tencent Technology (Shenzhen) Company Limited, Shenzhen (CN)

(72) Inventors: Jun Zhang, Shenzhen (CN); Kuan Tian, Shenzhen (CN); Xiao Han, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 520 days.

(21) Appl. No.: 17/980,439

(22) Filed: Nov. 3, 2022

(65) Prior Publication Data
US 2023/0058876 A1 Feb. 23, 2023

Related U.S. Application Data

(63) Continuation of application No. PCT/CN2022/080947, filed on Mar. 15, 2022.

(30) Foreign Application Priority Data

Mar. 18, 2021 (CN) .......................... 202110292517.2

(51) Int. Cl.
*G06T 7/00* (2017.01)
*G06T 3/40* (2024.01)
(Continued)

(52) U.S. Cl.
CPC .............. *G06T 7/0014* (2013.01); *G06T 3/40* (2013.01); *G06T 5/50* (2013.01); *G06T 5/70* (2024.01);
(Continued)

(58) Field of Classification Search
CPC ........... G06T 7/0014; G06T 5/70; G06T 3/40; G06T 5/50; G06T 5/00
See application file for complete search history.

(56) References Cited

U.S. PATENT DOCUMENTS

2010/0265385 A1 10/2010 Knight et al.
2019/0110028 A1 4/2019 Borel et al.

FOREIGN PATENT DOCUMENTS

CN 108510556 A 9/2018
CN 110309910 A 10/2019
(Continued)

OTHER PUBLICATIONS

K. KoÅ¡ÄeviÄ, M. SubaÅ¡iÄ and S. LonÄariÄ, "Deep Learning-Based Illumination Estimation Using Light Source Classification," in IEEE Access, vol. 8, pp. 84239-84247, 2020, doi: 10.1109/ACCESS.2020.2992121 (Year: 2020).*

(Continued)

*Primary Examiner* — Gregory A Morse
*Assistant Examiner* — Ty Mitchell Beatty
(74) *Attorney, Agent, or Firm* — Morgan, Lewis & Bockius LLP

(57) ABSTRACT

An image processing method includes: acquiring a standard image matched with an image processing model; determining light field variation parameters of a use environment of the image processing model based on the standard image; determining an image training sample set based on the light field variation parameters, the image training sample set including images of different light field backgrounds; training a correction network of the image processing model through the image training sample set to obtain a model updating parameter adapted to the correction network, and generating a trained image processing model based on the model updating parameter; acquiring a single image in the use environment, and performing prediction processing on (Continued)

the single image through the trained image processing model to obtain light field information corresponding to the single image; and correcting a light field of the single image based on the light field information.

19 Claims, 11 Drawing Sheets

(51) Int. Cl.
   *G06T 5/50* (2006.01)
   *G06T 5/70* (2024.01)

(52) U.S. Cl.
   CPC .............. *G06T 2207/10056* (2013.01); *G06T 2207/20081* (2013.01); *G06T 2207/20084* (2013.01); *G06T 2207/30096* (2013.01); *G06T 2207/30168* (2013.01)

(56) References Cited

FOREIGN PATENT DOCUMENTS

| CN | 111079733 A | 4/2020 |
|---|---|---|
| CN | 111489401 A | 8/2020 |
| CN | 112399162 A | 2/2021 |
| CN | 113724190 A | 11/2021 |
| EP | 3291173 A1 | 3/2018 |
| WO | WO 2014043641 A1 | 3/2014 |

OTHER PUBLICATIONS

X. Cao, S. Rong, Y. Liu, T. Li, Q. Wang and B. He, "NUICNet: Non-Uniform Illumination Correction for Underwater Image Using Fully Convolutional Network," in IEEE Access, vol. 8, pp. 109989-110002, 2020, doi: 10.1109/ACCESS.2020.3002593 (Year: 2020).*

Koptyra, K.; Ogiela, M.R. ImagechainăApplication of Blockchain Technology for Images. Sensors, published Dec. 25, 2020, 21, 82. https://doi.org/10.3390/s21010082 (Year: 2020).*

A. Chaurasia and E. Culurciello, "LinkNet: Exploiting encoder representations for efficient semantic segmentation," 2017 IEEE Visual Communications and Image Processing (VCIP), St. Petersburg, FL, USA, 2017, pp. 1-4, doi: 10.1109/VCIP.2017.8305148 (Year: 2017).*

Tencent Technology, ISR, PCT/CN2022/080947, May 24, 2022, 3 pgs.

Zhenrong Lin et al. "Research on Light Field Correction Based on LinkNet in HER2 Pathological Image", 2021 International Conference on Information Technology and Biomedical Engineering (ICITBE), Dec. 26, 2021, 3 pgs.

Tencent Technology (Shenzhen) Company Limited, WO, PCT/CN2022/080947, May 24, 2022, 5 pgs.

Tencent Technology (Shenzhen) Company Limited, IPRP, PCT/CN2022/080947, Sep. 12, 2023, 6 pgs.

Abhishek Chaurasia et al., "LinkNet: Exploiting Encoder Representations for Efficient Semantic Segmentation", 2017 IEEE Visual Communications and Image Processing (VCIP), Dec. 2017, 5 pgs.

Karlo Koščević et al., "Deep Learning-Based Illumination Estimation Using Light Source Classification", IEEE Access, vol. 8, May 2020, 9 pgs.

Katarzyna Koptyra et al., "Imagechain—Application of Blockchain Technology for Images", Intelligent Security Sensors in Cloud Computing, vol. 21, Issue 1, Dec. 2020, 12 pgs.

Xueting Cao et al., "NUICNet: Non-Uniform Illumination Correction for Underwater Image Using Fully Convolutional Network", IEEE Access, vol. 8, Jun. 2020, 14 pgs.

* cited by examiner

IMAGE PROCESSING METHOD AND APPARATUS BASED ON IMAGE PROCESSING MODEL, ELECTRONIC DEVICE, STORAGE MEDIUM, AND COMPUTER PROGRAM PRODUCT

CROSS-REFERENCE TO RELATED APPLICATIONS

This application is a continuation application of PCT Patent Application No. PCT/CN2022/080947, entitled "IMAGE PROCESSING METHOD AND APPARATUS BASED ON IMAGE PROCESSING MODEL, AND ELECTRONIC DEVICE, STORAGE MEDIUM AND COMPUTER PROGRAM PRODUCT" filed on Mar. 15, 2022, which claims priority to Chinese Patent Application No. 202110292517.2, filed with the State Intellectual Property Office of the People's Republic of China on Mar. 18, 2021, and entitled "IMAGE PROCESSING METHOD AND DEVICE BASED ON MEDICAL IMAGE PROCESSING MODEL", all of which are incorporated herein by reference in their entirety.

FIELD OF THE TECHNOLOGY

This application relates to image processing technologies, in particular to an image processing method and apparatus based on an image processing model, an electronic device, a storage medium, and a computer program product.

BACKGROUND OF THE DISCLOSURE

In classification identification based on deep learning, a neural network model may be adopted to assist the related processing of medical information, for example, artificial intelligence (AI)+medical scene; and after a large number of images are learned by the laid-out neural network model, the images may be classified and identified, so as to quickly and accurately acquire relevant image analysis results.

However, in related art, the acquired images are usually subject to light field correction due to uneven ambient light source and jitter in an imaging process of a camera. In order to acquire a clear image, a plurality of images of the same target often need to be collected repeatedly. The light field correction may be realized only after determining corresponding equations of the images, to not only increase photographing costs and image storage costs, but also increase time of light field correction, thereby wasting a lot of storage space and computing resources.

SUMMARY

In view of this, embodiments of this application provide an image processing method and apparatus based on an image processing model, an electronic device, a computer-readable storage medium, and a computer program product, so that optical field correction may be accelerated.

The technical solutions in the embodiments of this application are implemented as follows:

Embodiments of this application provide an image processing method based on an image processing model, the method including:
  acquire a standard image matched with an image processing model;
  determine light field variation parameters corresponding to a use environment of the image processing model based on the standard image;
  determine an image training sample set matched with the use environment of the image processing model based on the light field variation parameters, the image training sample set including images of different light field backgrounds;
  training a correction network of the image processing model through the image training sample set to obtain a model updating parameter adapted to the correction network, and generating a trained image processing model based on the model updating parameter;
  acquiring a single image in the use environment, and performing prediction processing on the single image through the trained image processing model to obtain light field information corresponding to the single image; and
  correct a light field of the single image based on the light field information.

Embodiments of this application provide an image processing apparatus based on an image processing model, the apparatus including:
  an information transmission module configured to acquire a standard image matched with the image processing model; and
  an information processing module configured to determine light field variation parameters corresponding to a use environment of the image processing model based on the standard image;
  the information processing module is configured to determine an image training sample set matched with the use environment of the image processing model based on the light field variation parameters, the image training sample set including images of different light field backgrounds;
  the information processing module is configured to train a correction network of the image processing model through the image training sample set to obtain a model updating parameter adapted to the correction network, and generate a trained image processing model based on the model updating parameter;
  the information processing module is configured to acquire a single image in the use environment, and perform prediction processing on the single image through the trained image processing model to obtain light field information corresponding to the single image; and
  the information processing module is configured to correct a light field of the single image based on the light field information.

An embodiment of this application provides an electronic device, the electronic device including:
  a memory, configured to store executable instructions; and
  a processor, configured to implement, when executing the executable instructions stored in the memory, the image processing method based on an image processing model described above.

An embodiment of this application provides a computer-readable storage medium storing executable instructions, the executable instructions, when executed by a processor, implementing the image processing method based on an image processing model according to this embodiment of this application.

An embodiment of this application provides a computer program product, including a computer program or instruction, the computer program or instruction causing a computer to implement the image processing method based on an image processing model described above.

This embodiment of this application has the following beneficial effects:

an image processing model is trained based on a standard image to obtain a trained image processing model. Meanwhile, at an application stage, the trained image processing model may complete prediction of a light field by only acquiring a single image, and may complete correction of the light field of the image based on predicted light field information. As a result, the light field correction is accelerated; the efficiency of light field correction is improved; and relevant storage space and computing resources are saved.

DESCRIPTION OF EMBODIMENTS

Figure 1:
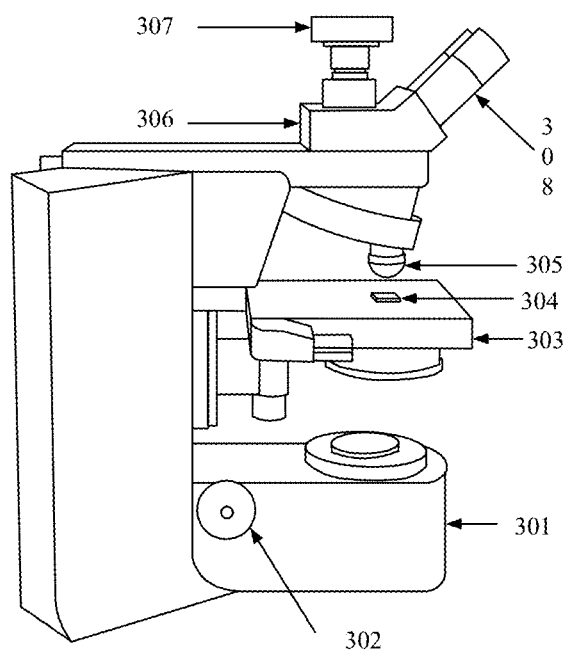
FIG. 1 is a structural schematic diagram of a microscope system in a related art.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict.

Before the embodiments of this application are further described in detail, a description is made on nouns and terms involved in the embodiments of this application, and the nouns and terms involved in the embodiments of this application are applicable to the following explanations.

1) "In response to" is used for representing a condition or status on which one or more operations to be performed depend. When the condition or status is satisfied, the one or more operations may be performed immediately or after a set delay; and Unless explicitly stated, there is no limitation on the order in which the plurality of operations are performed.

2) Client is a carrier for implementing a specific function in a terminal, for example, a mobile client (APP) is a carrier for implementing a specific function in a mobile terminal, such as, a function of performing online livestreaming (live video streaming) or a function of playing online videos.

3) A convolutional neural network (CNN) is a feedforward neural network that contains convolution calculation and has a deep structure, which is one of representative algorithms of deep learning. Convolutional neural networks have a capability of representation learning and are capable of performing shift-invariant classification on the inputted information according to a hierarchical structure.

4) Model training is used for multi-classification learning of image datasets. The model may be constructed by deep learning frameworks such as Tensor Flow and torch; and the image processing model is formed by combining a plurality of layers of neural network layers such as CNN.

5) Neural network (NN), artificial neural network (ANN), short for neural network or neural-like network, is a mathematical or computational model for imitating the structure and function of a biological neural network (a central nervous system of animals, especially the brain) in the field of machine learning and cognitive science, and is used for estimating or approximating functions.

6) Contrastive Loss may be used for learning a mapping relationship. By adopting the mapping relationship, points of the same class but far distance in a high-dimensional space get closer after the points are mapped to a low-dimensional space by a function; and points of different classes but near distance get farther after the points are mapped to the low-dimensional space. As a result, in a low-dimensional space, points of the same class may have a clustering effect, and points of different classes may be separated. It is similar to fisher dimension reduction, but fisher dimension reduction has no effect of out-of-sample extension and is unable to work on a new sample.

7) Computer aided diagnosis (AD) and computer aided design (CAD) are used for assisting in finding lesions and improving the accuracy of diagnosis through imaging, image processing model training technologies and other possible physiological and biochemical means in combination with computer analysis and calculation.

8) Endoscope video streaming is applied to pathological information of a video state formed after collecting images of body parts (different target organs of human body or internal lesions) with an image collection device (e.g., an endoscope).

9) Lesion refers to a part of the body in which a lesion occurs. Alternatively, a localized pathological tissue with pathogenic microorganisms may be referred to as a lesion.

10) Image is an image formed by collecting images of a target object with an image collection device, the collected images including the images of the target object, and the image including medical images (e.g., images of a body part collected by an endoscope, and images of a lesion section collected by a microscope), industrial images (e.g., images of an object collected by an industrial camera), etc.

A process of collecting an image (e.g., a microscope image) with a microscope in the related art is described first. Referring to FIG. 1, FIG. 1 being a structural schematic diagram of a microscope system in the related art, the microscope 300 is provided with a microscope body 301, microscope body stage focusing knobs 302, a microscope body stage 303, a to-be-observed specimen 304, a microscope body objective lens 305, a trinocular tube 306, a camera 307 and an eyepiece 308. The microscope body stage 303 is arranged above the microscope body 301; the to-be-observed specimen 304 is placed on the microscope body stage 303; microscope body stage focusing knobs 302 are arranged at two sides of the microscope body 301; the microscope body objective lens 305 is located above the microscope body stage 303; the trinocular tube 306 is further arranged above the microscope body objective lens 305; and the trinocular tube 306 is respectively connected with the camera 307 and the eyepiece 308. The microscope body stage 303 may be adjusted to rise or fall in a vertical direction by adjusting the microscope body stage focusing knobs 302, thereby changing a distance between the microscope body stage 303 and the microscope body objective lens 305 to implement focusing. Certainly, the distance between the microscope body stage 303 and the microscope body objective lens 305 may also be changed by moving the microscope body objective lens 305, to implement focusing.

In the field of automatic analysis for microscope images, high-quality images collected by the camera are the guarantee to improve the algorithm accuracy of a microscope. An image photographed by a camera being out of focus or affected by a light source may lose a lot of important optical information, to affect observation for the image. In order to acquire a clear image as a training sample, a plurality of images of the same target need to be collected repeatedly to implement light field correction. As a result, photographing costs and image storage costs may be increased.

Figure 2:
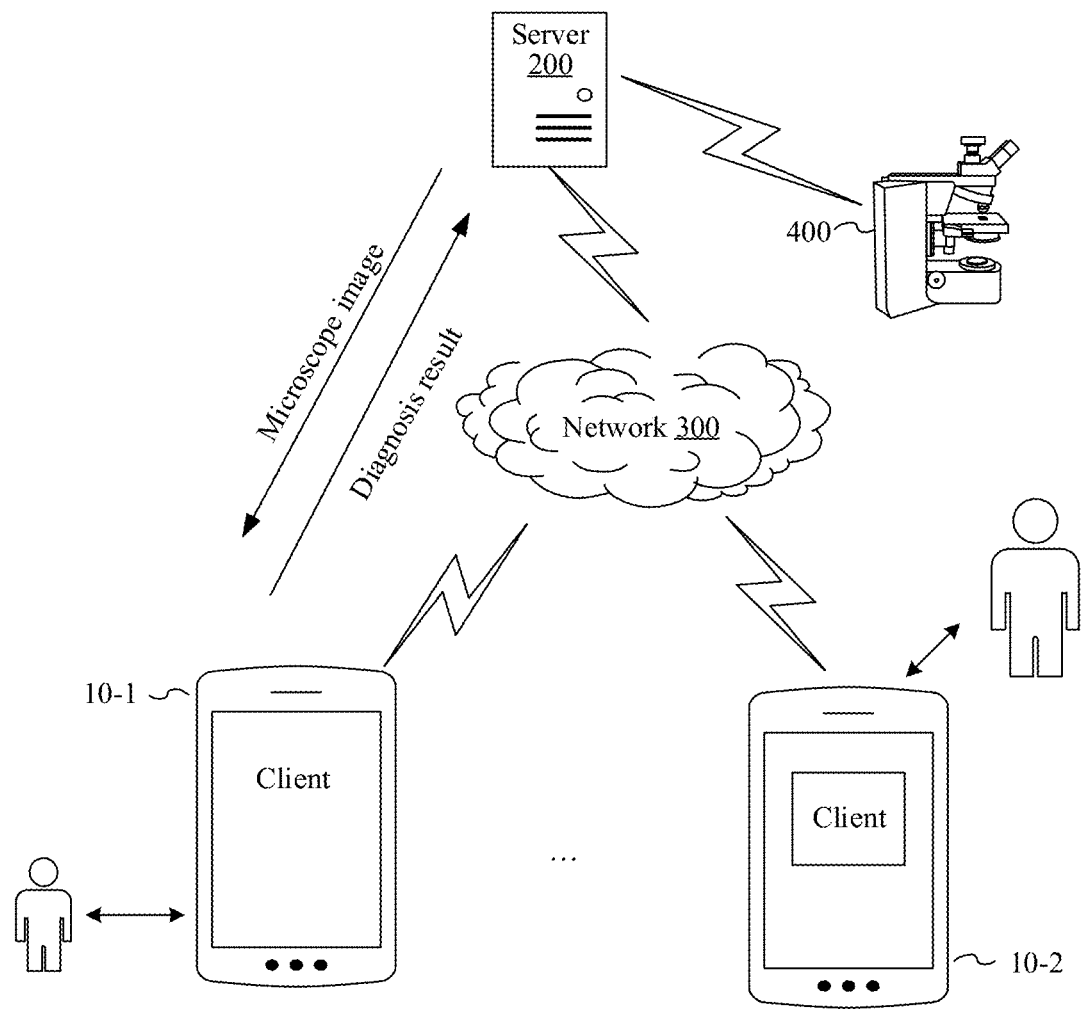
FIG. 2 is a structural schematic diagram of an image processing model provided by embodiments of this application.

Embodiments of this application provide an image processing method based on an image processing model. The image processing method based on an image processing model provided by embodiments of this application is described below by taking observation for a corresponding lesion cell section with a microscope as an example. Referring to FIG. 2, FIG. 2 is a schematic diagram of a use scene of the image processing method based on an image processing model provided by embodiments of this application. Referring to FIG. 2, clients capable of executing different functions are arranged on terminals (including a terminal 10-1 and a terminal 10-2), the terminals (including the terminal 10-1 and the terminal 10-2) of the client acquiring different section images from a server 200 through a network 300 for browsing, the terminals being connected with the server 200 through the network 300, and the network 300 being a wide area network or a local area network, or a combination of the two. Data transmission is implemented with a radio link, types of the section images acquired by the terminals (including the terminal 10-1 and the terminal 10-2) from the server 200 through the network 300 being the same or different, for example: the terminals (including the terminal 10-1 and the terminal 10-2) may either acquire a pathological image or a pathological video matched with a target object from the server 200 through the network 300, or acquire a pathological section matched with a current target from the server 200 through the network 300 for browsing. A microscope image in a corresponding light field environment may also be acquired from a microscope 400; and the server 200 may store section images respectively corresponding to different target objects, and may also store auxiliary analysis information matched with the section images of the target objects.

The neural network model in the field of artificial intelligence laid out by the server may analyze a real-time image by utilizing an image of a to-be-observed sample collected by a camera on a traditional optical microscope, and combining with a machine learning algorithm. Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result.

The AI is a comprehensive technology of computer sciences, attempts to understand essence of intelligence, and produces a new intelligent machine that can react in a manner similar to human intelligence. The AI is to study the design principles and implementation methods of various intelligent machines, to enable the machines to have the functions of perception, reasoning, and decision-making. An AI software technology mainly includes fields such as a computer vision (CV) technology, a voice processing technology, a natural language processing technology, and machine learning/deep learning (DL).

Patient lesions viewed under a microscope system (a medical device in contact with a pathological cell section of a target subject) may appear in a plurality of different application scenes, such as screening for lung cancer cells, screening for early cervical cancer, and screening for different cell sections. The microscope system according to embodiments of this application may be laid out in a plurality of application scenes through the image processing method based on the image processing model, so that a doctor may remotely review and use the microscope system conveniently.

As an example, the server 200 transmits pathological information of the same target object to the terminals (including the terminal 10-1 and/or the terminal 10-2) through the network 300; and a user of the terminals (including the terminal 10-1 and/or the terminal 10-2) analyzes the pathological information of the target object. For example, a corresponding neural network model is laid out in the server 200, for analyzing clear image information outputted by the microscope system, the processing of the image by the microscope system being implemented in the following modes: acquire a standard image matched with an image processing model; determine light field variation parameters corresponding to a use environment of the image processing model based on the standard image; determine an image training sample set matched with the use environment of the image processing model based on the light field variation parameters, the image training sample set including images of different light field backgrounds; train a correction network of the image processing model through the image training sample set to obtain a model updating parameter adapted to the correction network, and generate a trained image processing model based on the model updating parameter; acquire a single image in the use environment, and perform prediction processing on the single image through the trained image processing model to obtain light field information corresponding to the single image; and correct a light field of the single image based on the light field information to obtain a corrected image, and transmit the corrected image to a terminal (including a terminal 10-1 and/or a terminal 10-2); and a user of the terminal (including the terminal 10-1 and/or the terminal 10-2) performs auxiliary analysis on the pathological information of a target object based on the corrected image.

In some embodiments, the image may be any image with an imaging process affected by light conditions in a medical environment, such as a set of multi-view pathological images obtained by a doctor repeatedly observing a suspected lesion region by moving a camera, switching magnification and performing other operations during the use of an endoscope, the set fusing information about a specific view under the endoscope. Since video streaming of the endoscope records all the information in the view of the endoscope during the observation of a patient lesion by a doctor, information that the doctor observes a single patient lesion in the view of the endoscope is used as continuous video streaming. Thus, a situation that the doctor ignores a minimal lesion region during rapid movement of the endoscope is avoided, thereby providing more information than a single frame image to assist the doctor in diagnosing and discovering the minimal lesion region.

As an example, a corresponding neural network model is laid out in the terminal (including the terminal 10-1 and/or the terminal 10-2), for analyzing clear image information outputted by the microscope system, the processing of the image by the microscope system being implemented in the following modes: acquire a standard image matched with an image processing model; determine light field variation parameters corresponding to a use environment of the image processing model based on the standard image; determine an image training sample set matched with the use environment of the image processing model based on the light field variation parameters, the image training sample set including images of different light field backgrounds; train a correction network of the image processing model through the image training sample set to obtain a model updating parameter adapted to the correction network, and generate a trained image processing model based on the model updating parameter; acquire a single image in the use environment, and perform prediction processing on the single image through the trained image processing model to obtain light field information corresponding to the single image; and correct a light field of the single image based on the light field information to obtain a corrected image; and a user of the terminal (including the terminal 10-1 and/or the terminal 10-2) performs auxiliary analysis on the pathological information of a target object based on the corrected image.

Embodiments of this application may be implemented in combination with a cloud technology, the cloud technology referring to a hosting technology for unifying a series of resources, such as hardware, software and a network, in a wide area network or a local area network to implement computation, storage, processing and sharing of data; and the cloud technology being also understood as a generic term for network technology, information technology, integration technology, management platform technology and application technology based on cloud computing service model applications. A background service of a technical network system requires a large amount of computing and storage resources, such as video websites, image websites, and more portal websites. Therefore, the cloud technology needs to be supported by cloud computing.

Cloud computing is a computing mode, in which computing tasks are distributed on a resource pool formed by a large quantity of computers, so that various application systems can obtain computing power, storage space, and information services according to requirements. A network that provides resources is referred to as a "cloud". For a user, resources in a "cloud" seem to be infinitely expandable, and can be obtained readily, used on demand, expanded readily, and paid according to usage. As a basic capability provider for cloud computing, a cloud computing resource pool platform, referred to as a cloud platform for short and generally referred to as infrastructure as a service (IaaS), is established; and various types of virtual resources are laid out in a resource pool for an external client to choose to use. The cloud computing resource pool mainly includes: a computing device (which may be a virtualized machine, including an operating system), a storage device, and a network device.

Figure 3:
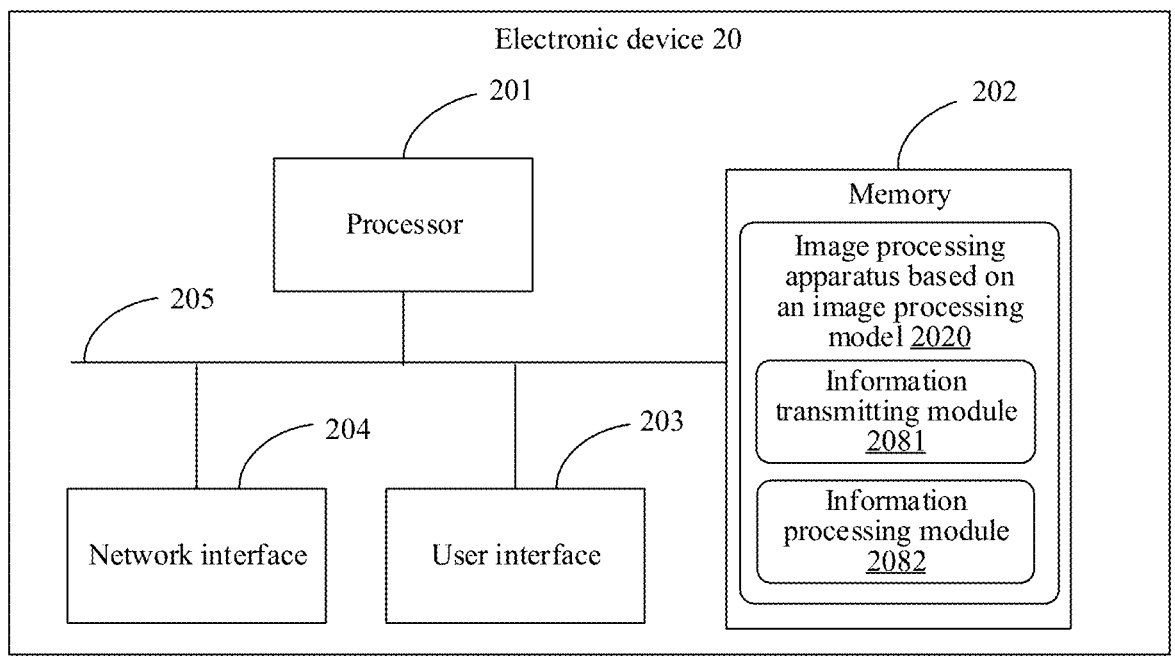
FIG. 3 is a structural schematic diagram of constitution of an electronic device provided by embodiments of this application.

A structure of the electronic device according to embodiments of this application is described in detail below. The electronic device may be implemented in various forms, such as a dedicated terminal with a training function for an image processing model, and may also be a cloud server with a training function for the image processing model, such as the server 200 in FIG. 2 described above. FIG. 3 is a schematic structural diagram of composition of an electronic device according to an embodiment of the present invention. It may be understood that, FIG. 3 shows only an exemplary structure rather than a complete structure of the electronic device. The structure shown in FIG. 3 may be partially or entirely implemented based on requirements.

An embodiment of this application provides an electronic device, including: at least one processor 201, a memory 202, a user interface 203, and at least one network interface 204. The components in the electronic device are coupled by using a bus system 205. It may be understood that the bus system 205 is configured to implement connection and communication between the components. In addition to a data bus, the bus system 205 further includes a power bus, a control bus, and a status signal bus. However, for ease of clear description, all types of buses are marked as the bus system 205 in FIG. 3.

The user interface 203 may include a display, a keyboard, a mouse, a trackball, a click wheel, a key, a button, a touchpad, or a touch screen.

It may be understood that, the memory 202 may be a volatile memory or a non-volatile memory, or may include both a volatile memory and a non-volatile memory. The memory 202 in this embodiment of this application can store data to support operation of the electronic device. Examples of the data include: any computer program to be operated on the electronic device, for example, an operating system and an application program. The operating system includes various system programs, such as framework layers, kernel library layers, and driver layers used for implementing various basic service and processing hardware-based tasks. The application program may include various application programs.

In some embodiments, the image processing apparatus based on an image processing model provided in this embodiment of this application may be implemented by a combination of software and hardware. For example, the image processing apparatus based on an image processing model provided in this embodiment of this application may be a processor in the form of a hardware decoding processor, and is programmed to perform the image processing method based on an image processing model provided in this embodiment of this application. For example, the processor in the form of a hardware decoding processor may use one or more application-specific integrated circuits (ASIC), a DSP, a programmable logic device (PLD), a complex PLD (CPLD), a field programmable gate array (FPGA), or another electronic element.

For example, the image processing apparatus based on an image processing model provided in this embodiment of this application is implemented by a combination of software and hardware. The image processing apparatus based on an image processing model provided in this embodiment of this application may be directly embodied as a combination of software modules executed by the processor 201. The software module may be located in a storage medium, the storage medium is located in the memory 202, and the processor 201 reads executable instructions included in the software module in the memory 202. The image processing method based on an image processing model provided in this embodiment of this application is completed in combination with necessary hardware (for example, includes a processor 201 and another assembly connected to the bus 205).

As an example, the processor 201 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

In an example in which the image processing apparatus based on an image processing model provided in the embodiments of the present invention is implemented by hardware, the apparatus provided in the embodiments of the present invention may be directly executed by using the processor 201 in the form of a hardware decoding processor, for example, one or more application specific integrated circuits (ASIC), DSPs, programmable logic devices (PLD), complex programmable logic devices (CPLD), field-programmable gate arrays (FPGA), or other electronic elements, to perform the image processing method based on an image processing model provided in the embodiments of the present invention.

The memory 202 in this embodiment of the present invention is configured to store various types of data to support operation of the electronic device. Examples of the data include: any executable instruction to be operated on the electronic device, for example, an executable instruction. A program for implementing the image processing method based on an image processing model of this embodiment of this application may be included in the executable instruction.

In some other embodiments, the image processing apparatus based on an image processing model provided in the embodiments of the present invention may be implemented in the form of software. FIG. 3 shows an image processing apparatus 2020 based on an image processing model that is stored in the memory 202, which may be software in the form of a program, a plug-in, or the like, and include a series of modules. An example of the program stored in the memory 202 may include the image processing apparatus 2020 based on an image processing model. The image processing apparatus 2020 based on an image processing model includes the following software modules:

an information transmission module 2081 configured to acquire a standard image matched with the image processing model; an information processing module 2082 configured to determine light field variation parameters corresponding to a use environment of the image processing model based on the standard image; the information processing module 2082 is configured to determine an image training sample set matched with the use environment of the image processing model based on the light field variation parameters, the image training sample set including images of different light field backgrounds; the information processing module 2082 is configured to train a correction network of the image processing model through the image training sample set to obtain a model updating parameter adapted to the correction network, and generate a trained image processing model based on the model updating parameter; the information processing module 2082 is configured to acquire a single image in the use environment, and perform prediction processing on the single image through the trained image processing model to obtain light field information corresponding to the single image; and the information processing module 2082 is configured to correct a light field of the single image based on the light field information.

In some embodiments, the information processing module 2082 is further configured to determine a real image matched with the standard image; determine a mapping relationship between pixels of the standard image and pixels of the real image based on the standard image and the real image; and determine the light field variation parameters corresponding to the use environment of the image processing model based on the mapping relationship.

In some embodiments, the information processing module 2082 is further configured to determine a light field brightness variation range matched with the use environment of the image processing model; perform simulation processing on the standard image based on the light field brightness variation range and the light field variation parameters to obtain a simulated image and a light field image matched with the simulated image; and take a set of the simulated image and the light field image matched with the simulated image as an image training sample set matched with the use environment of the image processing model.

In some embodiments, the information processing module 2082 is further configured to determine a target smoothness parameter based on the use environment of the image processing model; and performing smoothness adjustment processing on the simulated image according to the target smoothness parameter to obtain an adjusted simulated image, a smoothness of the adjusted simulated image being adapted to the use environment of the image processing model.

In some embodiments, the information processing module 2082 is further configured to determine initial parameters of an encoder block and a decoder block of the correction network in the image processing model; perform back-propagation processing based on the initial parameters and the image training sample set to obtain updated parameters of the encoder block and the decoder block of the correction network; and iteratively updating, based on the updated parameters of the encoder block and the decoder block of the correction network, parameters of the encoder block and the decoder block of the correction network with the image training sample set, to obtain the model updating parameter adapted to the correction network.

In some embodiments, the information processing module 2082 is further configured to substitute a training sample from the image training sample set into a loss function corresponding to the encoder block and the decoder block of the correction network; and perform back-propagation processing based on the loss function to obtain the updated parameters corresponding to the encoder block and the decoder block of the correction network.

In some embodiments, the information processing module 2082 is further configured to perform noise reduction processing on an image through an image preprocessing network of the image processing model to obtain a noise-reduced image; perform down-sampling processing on the noise-reduced image through a convolutional layer and a maximum value pooling layer included in the image preprocessing network to obtain a down-sampled image; perform normalization processing on the down-sampled image through a fully connected layer of the image preprocessing network to obtain a normalized image; and perform deep decomposition processing on the normalized image through the image preprocessing network to obtain a light field feature vector matched with the image.

In some embodiments, the information processing module 2082 is further configured to determine a dynamic noise threshold matched with the use environment of the image processing model based on a position of a target region corresponding to the image; and perform noise reduction processing on the image based on the dynamic noise threshold to obtain an image matched with the dynamic noise threshold.

In some embodiments, the information processing module 2082 is further configured to determine a fixed noise threshold matched with the use environment of the image processing model based on the image type of the image; and perform noise reduction processing on the image based on the fixed noise threshold to obtain an image matched with the fixed noise threshold.

In some embodiments, the information processing module 2082 is further configured to set, in accordance with a determination that the use environment of the image processing model includes collecting an image with a microscope, an original image collected by the microscope as the single image.

In some embodiments, the information processing module 2082 is further configured to transmit a model identifier of the trained image processing model, the single image and the single image subjected to light field correction to a block chain network; filling a node of the block chain network with the model identifier of the trained image processing model, the single image, and the single image subjected to optical field correction into a new block; and in accordance with a determination that an agreement is reached for the new block, appending the new block to a tail part of the block chain.

Figure 4:
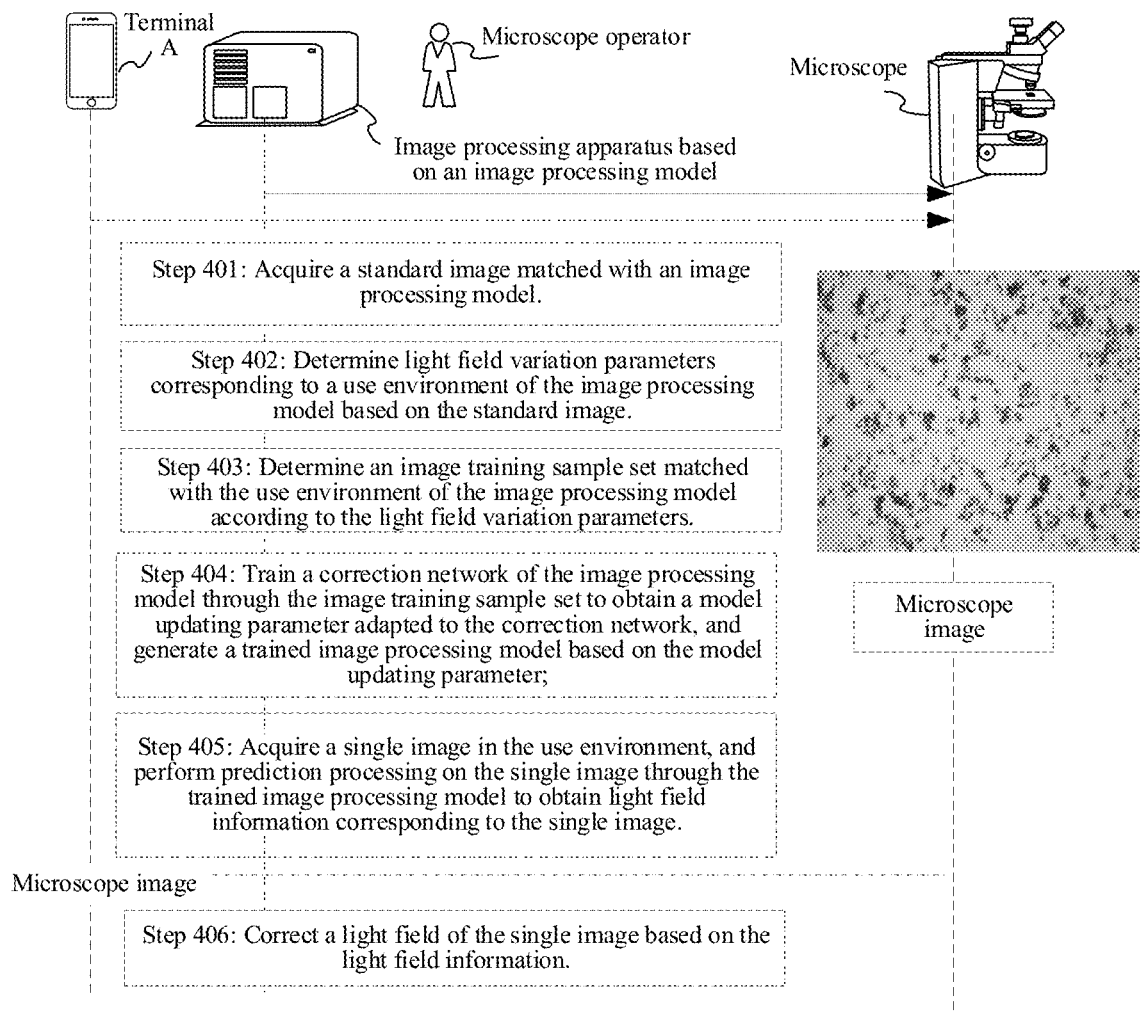
FIG. 4 is a flow chart of an image processing method based on an image processing model provided by embodiments of this application.

The image processing method based on the image processing model provided by embodiments of this application is described in combination with the image processing apparatus based on the image processing model shown in FIG. 3. Referring to FIG. 4, FIG. 4 is a flow chart of the image processing method based on the image processing model provided by embodiments of this application. Understandably, the image processing method based on the image processing model shown in FIG. 4 may be applied to a training field for the image processing model to realize the segmentation of the image, steps shown in FIG. 4 being executed by various electronic devices running the image processing apparatus based on the image processing model, such as a dedicated terminal, server or server cluster with a training function for the image processing model. The steps shown in FIG. 4 are described below.

Step 401: An image processing apparatus based on an image processing model acquires a standard image matched with a use environment of the image processing model.

The use environment may be shown as a lighting environment; changes in the lighting environment affect the accuracy of image collection; various use environments are applicable to the image processing method based on the image processing model provided in embodiments of this application; since use environments of the image processing model are different, light conditions and imaging cameras are also different, and the difficulty of acquiring sample data may be effectively reduced by collecting a standard image.

A standard image is a reference image of a training sample used for constructing an image processing model, such as a microscope image with uniform brightness.

Step 402: The image processing apparatus based on the image processing model determines light field variation parameters corresponding to the use environment of the image processing model based on the standard image.

In some embodiments, the image processing apparatus based on the image processing model determines light field variation parameters corresponding to the use environment of the image processing model based on the standard image may be implemented in the following modes:

determine a real image matched with the standard image; determine a mapping relationship between pixels of the standard image and pixels of the real image based on the standard image and the real image; and determine the light field variation parameters corresponding to the use environment of the image processing model based on the mapping relationship. Taking a microscope image (e.g., an image) as an example, brightness unevenness and brightness variation of the microscope image may be subjected to linear transformation through Formula (1):

$$I_{imaging}(x) = I_{real}(x) \times S(x) + D(x) \qquad \text{Formula (1)},$$

$I_{imaging}$ referring to a microscope image (e.g., a real image matched with a standard image) with a nonuniform light field photographed by an imaging device; $I_{real}$ referring to an ideal image (e.g., a standard image) with uniform brightness; S referring to a multiplicative light intensity; D referring to an additive dark field; x referring to any pixel in the image; and light field variation parameters including the multiplicative light intensity and the additive dark field, with a mapping relationship as shown in Formula (1).

For an environment taking microscope image analysis as the use environment, the change shown in Formula (1) may be simplified and realized by a single light field M, as shown in Formula (2):

$$I_{imaging}(x) = I_{real}(x) > M(x) \qquad \text{Formula (2)},$$

M referring to a uniform background light field; a transformation between an image photographed by a microscope and an ideal image being still expressed as a linear relationship; and the light field variation parameters including the single light field M (e.g., a linear transformation coefficient), with a mapping relationship as shown in Formula (2). Since each pixel of the microscope image has a specific linear transformation coefficient, a complete light field image may be formed by combining pixels.

Step 403: The image processing apparatus based on the image processing model determines an image training sample set matched with the use environment of the image processing model according to light the field variation parameters.

Figure 5:
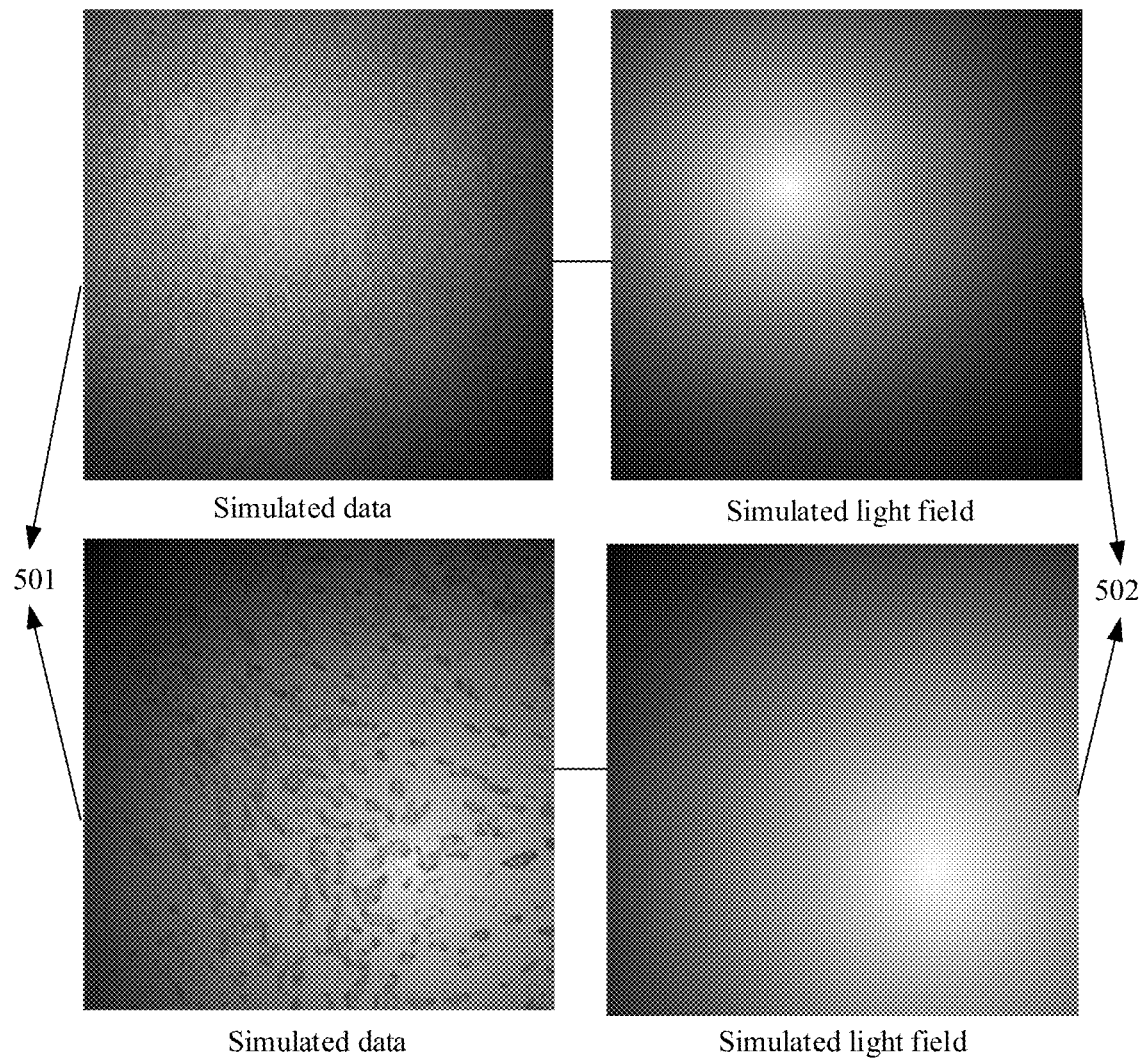
FIG. 5 is a schematic diagram of a training sample in embodiments of this application.

Referring to FIG. 5, FIG. 5 is a schematic diagram of a training sample in embodiments of this application; and the image processing apparatus based on the image processing model determines an image training sample set matched with the use environment of the image processing model according to the light field variation parameters may be implemented in the following modes:

determine a light field brightness variation range matched with the use environment of the image processing model; perform simulation processing on a standard image based on the light field brightness variation range and the light field variation parameters to obtain a simulated image and a light field image matched with the simulated image; and take a set of the simulated image and the light field image matched with the simulated image as an image training sample set matched with the use environment of the image processing model.

For example, a value of a light field variation parameter is randomly set to any value in a light field brightness variation range; a standard image is simulated based on a mapping relationship to obtain a simulated image (e.g., simulated data, such as an image 501 shown in FIG. 5) and a corresponding light field image (e.g., a simulated light field, such as an image 502 shown in FIG. 5); and the simulated data and the corresponding simulated light field are taken as training samples.

Since the acquired image is only a single image, paired images with nonuniform brightness and background light fields corresponding to the images need to be constructed according to the simulated data and taken as training samples, images with Gaussian distribution of light fields being simulated, with a brightness variation range of [a, b]. In the brightness variation range, a and b refer to parameters for brightness variation of the light field, and are set, in some embodiments, as a=0.5 and b=1.2 during training of an image processing model. Therefore, an image training sample set includes images with different light field backgrounds. Certainly, the images related to embodiments of this application may be images of different data fields, e.g., images of different modalities formed by scanning a human body or a certain part of a human body with different medical instruments. Images obtained from different medical application scenes belong to different data fields, the data fields indicating that the images belong to a certain medical device or a certain imaging modality. For example: the image may be a microscope image acquired by an optical microscope, or an electron microscope image acquired by an electron microscope.

In some embodiments, in the medical field, the images may reflect intrinsic heterogeneity of different disease symptoms, such as different degrees of difference in appearance (e.g., shape) of a certain part of human body. Therefore, the images may be used as a medical judgment means or reference factor for assisting clinical diagnosis. A terminal running an image processing model may select a corresponding image from an image database according to an inputted image selection instruction; alternatively, the terminal is subjected to a communication connection, such as a wired communication connection or a wireless communication connection, with a medical instrument to acquire an image formed by the medical instrument in the case that the medical instrument forms the image by scanning.

In some embodiments, the target smoothness parameter may also be determined based on the use environment of the image processing model; and smoothness adjustment processing is performed on the simulated image according to the target smoothness parameter to obtain an adjusted simulated image, a smoothness of the adjusted simulated image being adapted to the use environment of the image processing model.

Smoothness constraint may be implemented by controlling difference between adjacent pixels of a background light field to be minimized. For example: when variations of light fields corresponding to all pixels are consistent (constant), the difference is 0, and the light field is smoothest. When adjacent pixels are subjected to abrupt variation, the difference is too large, and the light field is unsmooth. Therefore, the smoothness of an output light field may be controlled by difference minimization constraint.

Step 404: The image processing apparatus based on the image processing model trains a correction network of the image processing model through the image training sample set to obtain a model updating parameter adapted to the correction network, and generates a trained image processing model based on the model updating parameter.

A light field corresponding to an image in a use environment may be predicted by the trained image processing model.

Step 405: The image processing apparatus based on the image processing model acquires a single image in the use environment, and performs prediction processing on the single image through the trained image processing model to obtain light field information corresponding to the single image.

For example, the light field information includes light field variation parameters, such as multiplicative light intensity and light field background information such as an additive dark field and a single light field.

Step 406: The image processing apparatus based on the image processing model corrects a light field of the single image based on the light field information.

Figure 6:
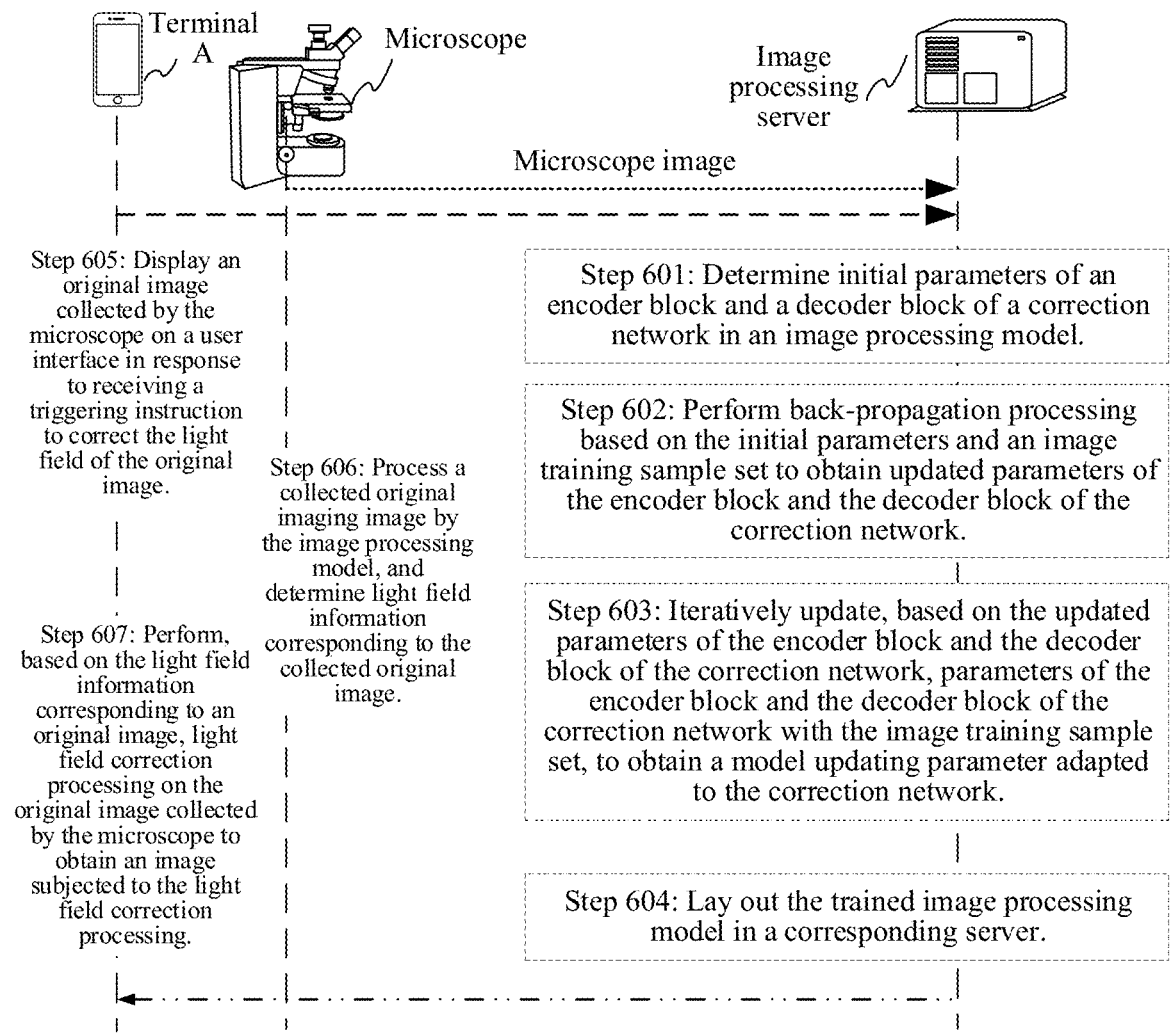
FIG. 6 is a schematic diagram of a training process of an image processing model in embodiments of this application.

Referring to FIG. 6, FIG. 6 is a schematic diagram of a training process of an image processing model in embodiments of this application; and the training process specifically includes the following steps:

Step 601: Determine initial parameters of an encoder block and a decoder block of a correction network in the image processing model.

Step 602: Perform back-propagation processing based on the initial parameters and the image training sample set to obtain updated parameters of the encoder block and the decoder block of the correction network, different training samples in the image training sample set being substituted into a loss function corresponding to the encoder block and the decoder block of the correction network; and back-propagation processing being performed based on the loss function to obtain the updated parameters corresponding to the encoder block and the decoder block of the correction network.

Step 603: Iteratively update, based on the updated parameters of the encoder block and the decoder block of the correction network, parameters of the encoder block and the decoder block of the correction network with the image training sample set, to obtain a model updating parameter adapted to the correction network;

during data updating for the encoder block and the decoder block of the correction network, different training samples in the image training sample set being substituted into a loss function corresponding to the encoder block and the decoder block of the correction network; and the updated parameters corresponding to the encoder block and the decoder block of the correction network in the case that the loss function satisfies corresponding convergence conditions being taken as the model updating parameters adapted to the correction network.

In some embodiments, to improve processing accuracy of the correction network, noise adjustment processing may be performed before processing the image, for example, noise reduction processing may be performed on the image through an image preprocessing network of the image processing model to obtain a noise-reduced image; downsampling processing (implemented by cross-applying a convolutional layer and a maximum value pooling layer) is performed on the noise-reduced image through the convolutional layer and the maximum value pooling layer included in the image preprocessing network to obtain a down-sampled image; normalization processing is performed on the down-sampled image through a fully connected layer of the image preprocessing network to obtain a normalized image; and deep decomposition processing is performed on the normalized image through the image preprocessing network to obtain a light field feature vector matched with the image.

The images related to embodiments of this application may be microscope images collected in different light environments, e.g., images of different modalities formed by scanning human body tissues or biological sample tissues with microscopes in different light environments. Images obtained from different medical application scenes belong to different data fields, the data fields indicating that the images belong to a certain medical device or a certain imaging modality. For example, both transmission image and reflection image may reflect surface information of a target object at the time of collecting a microscope image. Taking a target object being a human body tissue as an example, at the time of collecting a transmission image, different types of human body tissues have different light transmittances and are also in different light environments, certain types of tissues having poor light transmittances, and certain types of tissues having better light transmittances. Therefore, in the case that a light signal is transmitted through the human body tissues, fewer light signals are transmitted through regions accommodating the tissues with poor light transmittances; and more light signals are transmitted through regions accommodating the tissues with better light transmittances. Then, in the transmission image collected by the image collection device, darker regions are the regions accommodating the tissues with poor light transmittances in the human body tissues; brighter regions are the regions accommodating the tissues with better light transmittances in the human body tissues; and a boundary line between the darker region and the brighter region may also be apparent, so that regions accommodating different types of tissues may be better distinguished through the transmission image. A terminal running an image processing model may select a corresponding image from an image database according to an inputted image selection instruction; alternatively, the terminal is subjected to a communication connection, such as a wired communication connection or a wireless communication connection, with a medical instrument to acquire an image formed by the medical instrument in the case that the medical instrument forms the image by scanning.

In some embodiments, a dynamic noise threshold matched with a use environment of the image processing model may be determined based on a position of a target region corresponding to the image; and noise reduction processing is performed on the image based on the dynamic noise threshold to obtain an image matched with the dynamic noise threshold.

Different lesion locations also have different dynamic noise values in different images; and noise of images may generate different light spots to affect observation results of the same light condition, such as light spots of a microscope image. The light spots generated by noise may overlap light rays, thus affecting the accurate judgment for the images, and being adverse to the accuracy of auxiliary diagnosis. After a microscope scanning image with noise (e.g., an image) is acquired, spot recognition needs to be performed on the acquired image, to determine whether the image has a light spot and determine a severity value of the light spot. In addition, noise reduction processing may further be performed on the image through an image information processing network according to the determined dynamic noise threshold, thereby eliminating the light spot generated in the image of the lesion location due to the dynamic noise. In view of moving light spots, during scanning with the microscope, the noise is overlapped with influence of the light field, and the position or shape of the light field changes at the time of encoding and signal collection, so a phase error is generated to cause light spots with nonuniform brightness; and noise reduction processing is performed on the image through the image information processing network according to the determined dynamic noise threshold, so that the light spots generated during the collection of the microscope image due to dynamic noise may be eliminated.

In some embodiments, a fixed noise threshold matched with the use environment of the image processing model may further be determined based on the image type of the image; and noise reduction processing is performed on the image based on the fixed noise threshold to obtain an image matched with the fixed noise threshold.

In the case that an immune histochemical human epidermal growth factor receptor-2 (HER2) is photographed by a microscope, 500 images may be collected in the same light field environment. Since the noise is relatively single, the fixed noise threshold corresponding to the image processing model may be fixed to effectively increase the training speed of the image processing model and reduce the waiting time of a user.

Step 604: Lay out the trained image processing model in a corresponding server.

Thus, a light field corresponding to the image in the use environment may be predicted by the image processing model.

Step 605: Display an original image collected by the microscope on a user interface at the time of receiving a triggering operation for correcting the light field of the image.

Step 606: Process a collected original image by the image processing model, and determine light field information corresponding to the collected original image.

Step 607: Perform, based on the light field information corresponding to an original image, light field correction processing on the original image collected by the microscope to obtain an image subjected to the light field correction processing.

The light field correction processing is performed on the original image collected by the microscope to obtain the image subjected to the light field correction processing.

After the image subjected to the light field correction processing is acquired, the corresponding original image and the image subjected to the light field correction may further be stored through a cloud technology. Embodiments of this application may be implemented in combination with the cloud technology, the cloud technology referring to a hosting technology for unifying a series of resources, such as hardware, software and a network, in a wide area network or a local area network to implement computation, storage, processing and sharing of data; and the cloud technology being also understood as a generic term for network technology, information technology, integration technology, management platform technology and application technology based on cloud computing service model applications. A background service of a technical network system requires a large amount of computing and storage resources, such as video websites, image websites, and more portal websites. Therefore, the cloud technology needs to be supported by cloud computing.

Cloud computing is a computing mode, in which computing tasks are distributed on a resource pool formed by a large quantity of computers, so that various application systems can obtain computing power, storage space, and information services according to requirements. A network that provides resources is referred to as a "cloud". For a user, resources in a "cloud" seem to be infinitely expandable, and can be obtained readily, used on demand, expanded readily, and paid according to usage. As a basic capability provider for cloud computing, a cloud computing resource pool platform, referred to as a cloud platform for short and generally referred to as infrastructure as a service (IaaS), is established; and various types of virtual resources are laid out in a resource pool for an external client to choose to use. The cloud computing resource pool mainly includes: a computing device (which may be a virtualized machine, including an operating system), a storage device, and a network device.

In combination with an embodiment shown in FIG. 2, a target object determination method provided by embodiments of this application may be implemented by a corresponding cloud device, for example: a terminal (including a terminal 10-1 and a terminal 10-2) is connected with a server 200 located at a cloud through a network 300, the network 300 being a wide area network or a local area network or a combination of the two. Illustratively, the server 200 may be a physical device or a virtualized device.

With reference to FIG. 2 in the foregoing embodiments, the server 200 may be an independent physical server, may also be a server cluster or distributed system composed of a plurality of physical servers, and may also be a cloud server providing basic cloud computing services, such as a cloud service, a cloud database, cloud computing, a cloud function, cloud storage, a network service, cloud communication, a middleware service, a domain name service, a security service, a CDN, and a large data and AI platform. The terminal may be a smartphone, a tablet computer, a notebook computer, a desktop computer, a smart speaker, a smart watch, or the like, but is not limited thereto. The terminal and the server may be directly or indirectly connected in a wired or wireless communication manner. This is not limited in this application.

As shown in FIG. 2, the target object determination method provided by embodiments of this application may be implemented by a corresponding cloud device, for example: a terminal (including a terminal 10-1 and a terminal 10-2) is connected with a server 200 located at a cloud through a network 300, the network 300 being a wide area network or a local area network or a combination of the two. Illustratively, the server 200 may be a physical device or a virtualized device.

In some embodiments, the target object determination method provided by embodiments of this application further include:

receiving a data synchronization request of another node in the blockchain network; performing verification on a permission of the another node in response to the data synchronization request; and in the case that the authority of the other nodes is verified, controlling a current node to synchronize data with the other nodes, so that the other nodes acquires a model identifier of the trained image processing model, a single image and a single image subjected to the light field correction processing.

In some embodiments, in response to a query request, the query request is analyzed to acquire a corresponding object identifier; the permission information in the target block is obtained in the blockchain network according to the object identifier; a match between the permission information and the object identifier is verified; in accordance with a determination that the permission information matches the object identifier, a model identifier of the trained image processing model, a single image and a single image subjected to the light field correction processing are acquired from a block chain network; and in response to a query instruction, the acquired model identifier of the trained image processing model, single image and single image subjected to the light field correction processing are pushed to a corresponding client, so that the client may acquire the model identifier of the trained image processing model, the single image and the single image subjected to the light field correction processing stored in the block chain network.

Figure 7:
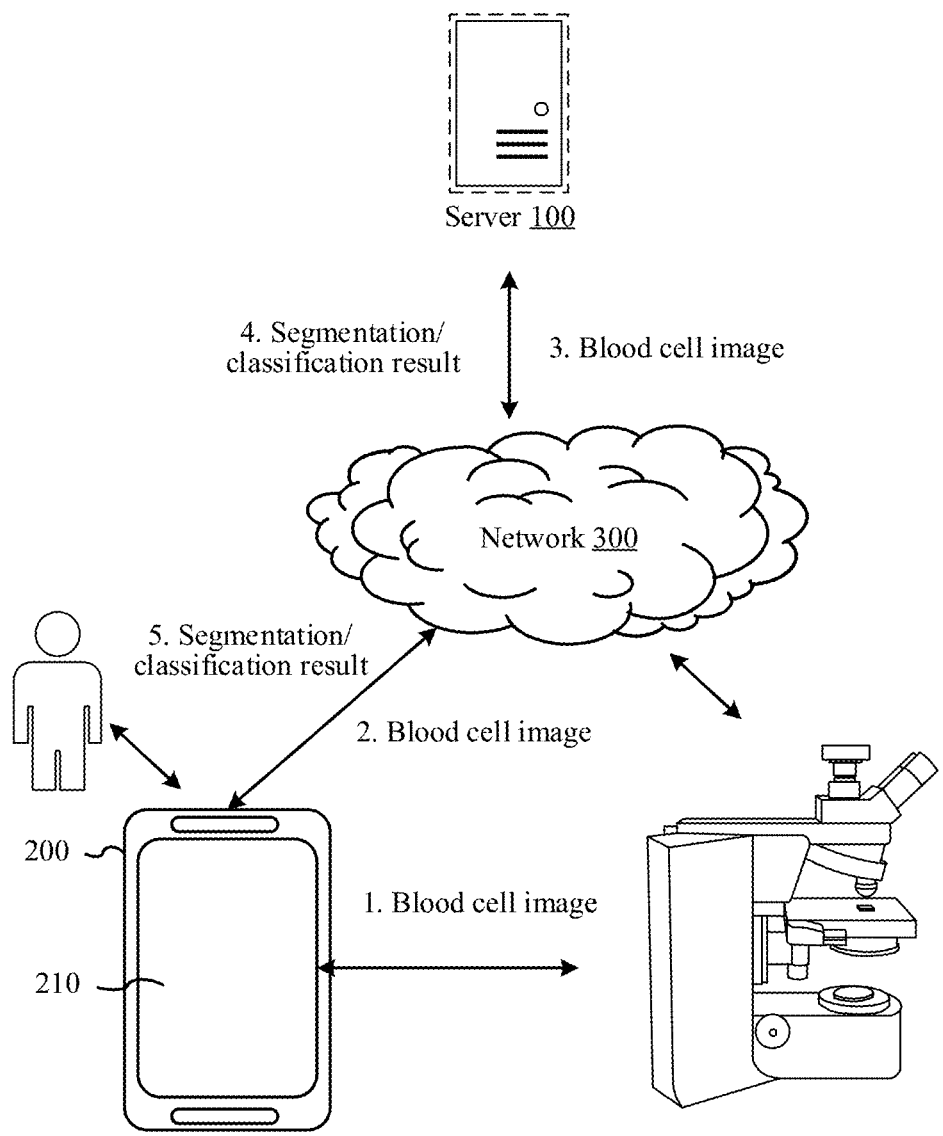
FIG. 7 is a schematic diagram of a use scene of an image processing method based on an image processing model provided by embodiments of this application.

Taking adjustment for an image light field of a cell slide of an HER2 of a target object as an example, an image processing method based on an image processing model provided by embodiments of this application is described below:

FIG. 7 is a schematic diagram of a use scene of an image processing method based on an image processing model provided by embodiments of this application. Referring to FIG. 7, a terminal 200 may be located in various institutions with medical properties (e.g., hospitals, institutes of medicine), and may be configured to collect various types of microscope images or endoscope images (e.g., cell slides (e.g., images, blood cell images) of an HER2 of a patient are collected by an image collection apparatus of the terminal 200 or other medical terminals (e.g., image collection devices)).

In some embodiments, the terminal 200 locally executes the image processing method based on the image processing model provided by embodiments of this application to complete type recognition of the cell slides of the HER2, and outputs a result of the type recognition in a graphical mode. As a result, the result of the type recognition is used by doctors and researchers to research diagnosis, follow-up and treatment methods of diseases, for example, the screening for breast cancer, ovarian cancer, endometrial cancer, fallopian tube cancer, stomach cancer and prostate cancer of a patient may be implemented according to a detection result of the cell slides of the HER2; and the morphological manifestations of different types of HER2 may be determined, to help diagnose whether a patient has a risk of cancer disease and lesion of lung tumor.

The terminal 200 may also transmit a microscope image of the cell slide of the HER2 to a server 100 through the network 300, and invoke a function of remote diagnosis service provided by the server 100; the server 100 lays out the trained image processing model through the image processing method based on the image processing model provided by embodiments of this application, acquires the microscope image subjected to the light field correction of the cell slide of the HER2 through the trained image processing model, performs type recognition, and returns a result of the type recognition to the terminal 200 for doctors and researchers to research diagnosis, follow-up and treatment methods of diseases.

The terminal 200 may display various intermediate and final results of training of the image processing model in a graphical interface 210, such as cell slides of HER2 and corresponding classification results.

Figure 8:
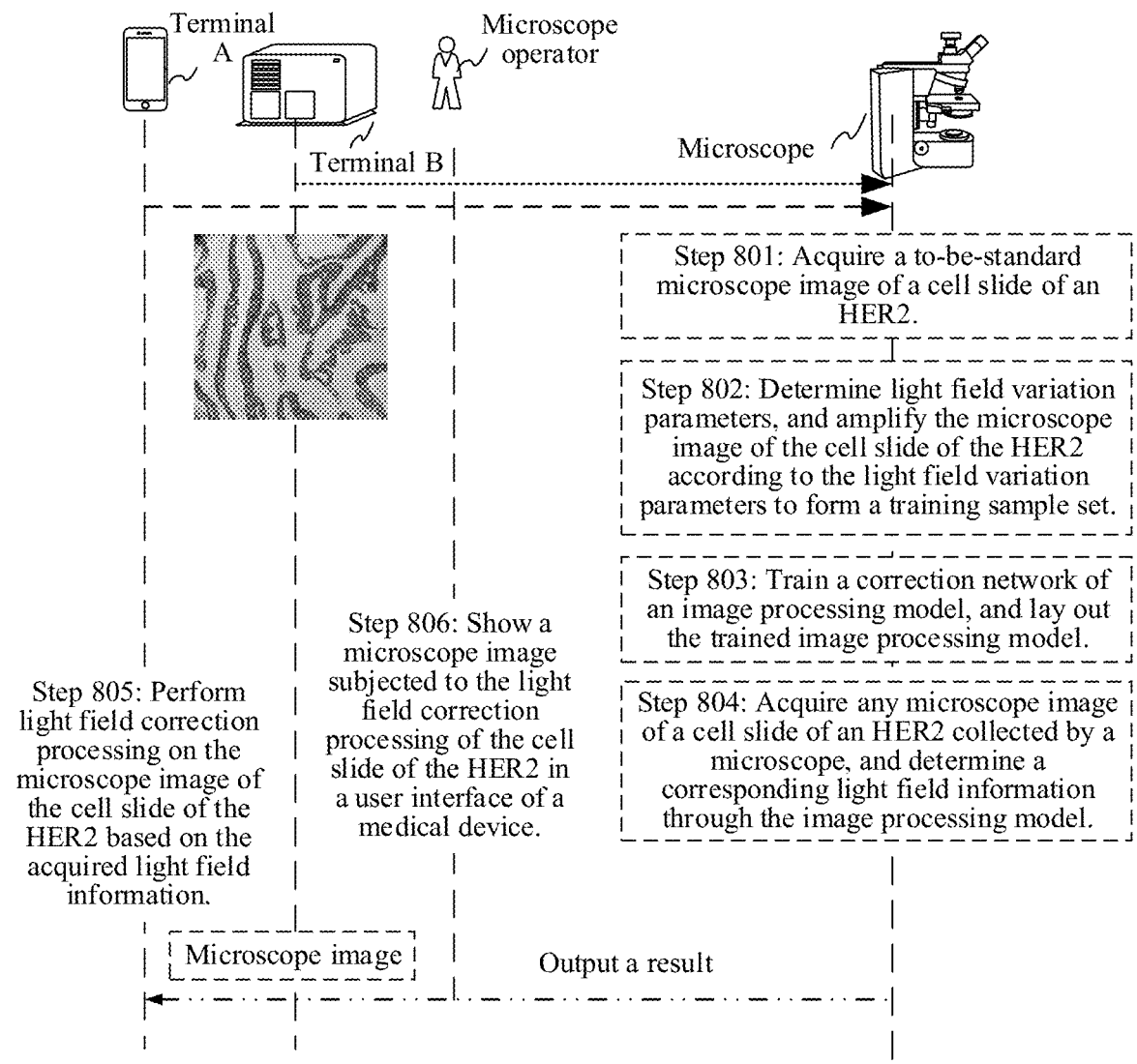
FIG. 8 is a flow chart of an image processing method based on an image processing model provided by embodiments of this application.

Referring to FIG. 8, FIG. 8 is a flow chart of an image processing method based on an image processing model provided by embodiments of this application, the user being a doctor to process a to-be-corrected microscope image of a cell slide of an HER2, the method specifically including the following steps:

Step 801: Acquire a standard microscope image of a cell slide of an HER2, the standard microscope image of the cell slide of the HER2 being a standard image.

Step 802: Determine light field variation parameters, and amplify the microscope image of the cell slide of the HER2 according to the light field variation parameters to form a training sample set.

Figure 9:
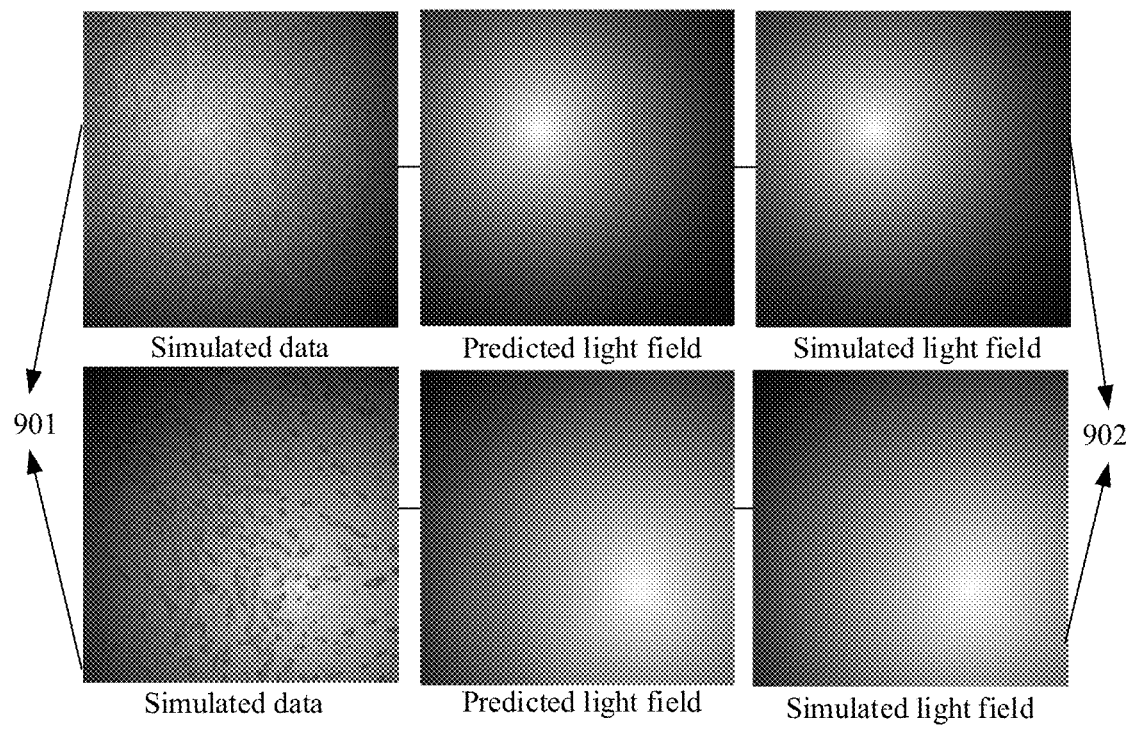
FIG. 9 is a schematic diagram of a training sample set of microscope images of cell slides of a human epidermal growth factor receptor-2 (HER2) in embodiments of this application.

FIG. 9 is a schematic diagram of a training sample set of microscope images of cell slides of an HER2 in embodiments of this application. After the light field brightness variation range of the microscope images of the cell slides of the HER2 is determined, a single microscope image of the cell slide of the HER2 is amplified according to the light field variation parameters based on the light field brightness variation range, to form simulated data as a training sample; and the training sample includes simulated data 901 (a simulated image) and a simulated light field 902 (a light field image) as shown in FIG. 9.

Step 803: Train a correction network of the image processing model, and lay out the trained image processing model.

Figure 10:
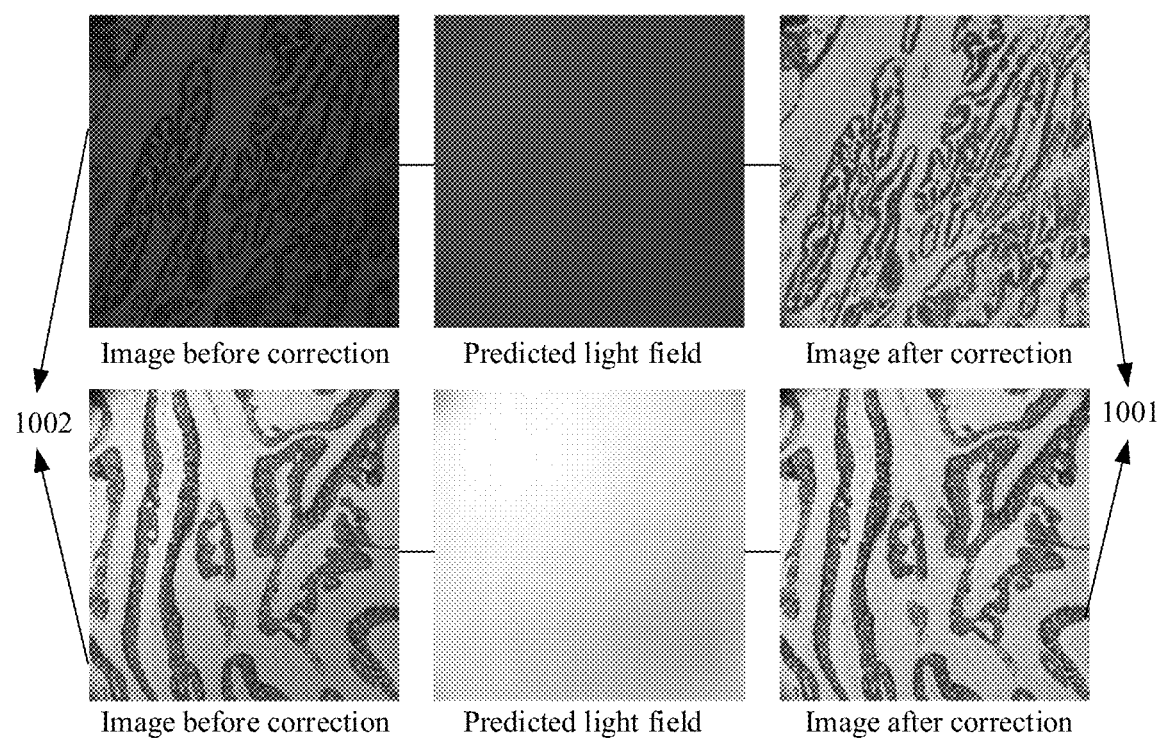
FIG. 10 is a schematic diagram of correction for microscope images of cell slides of an HER2 in embodiments of this application.
Figure 11:
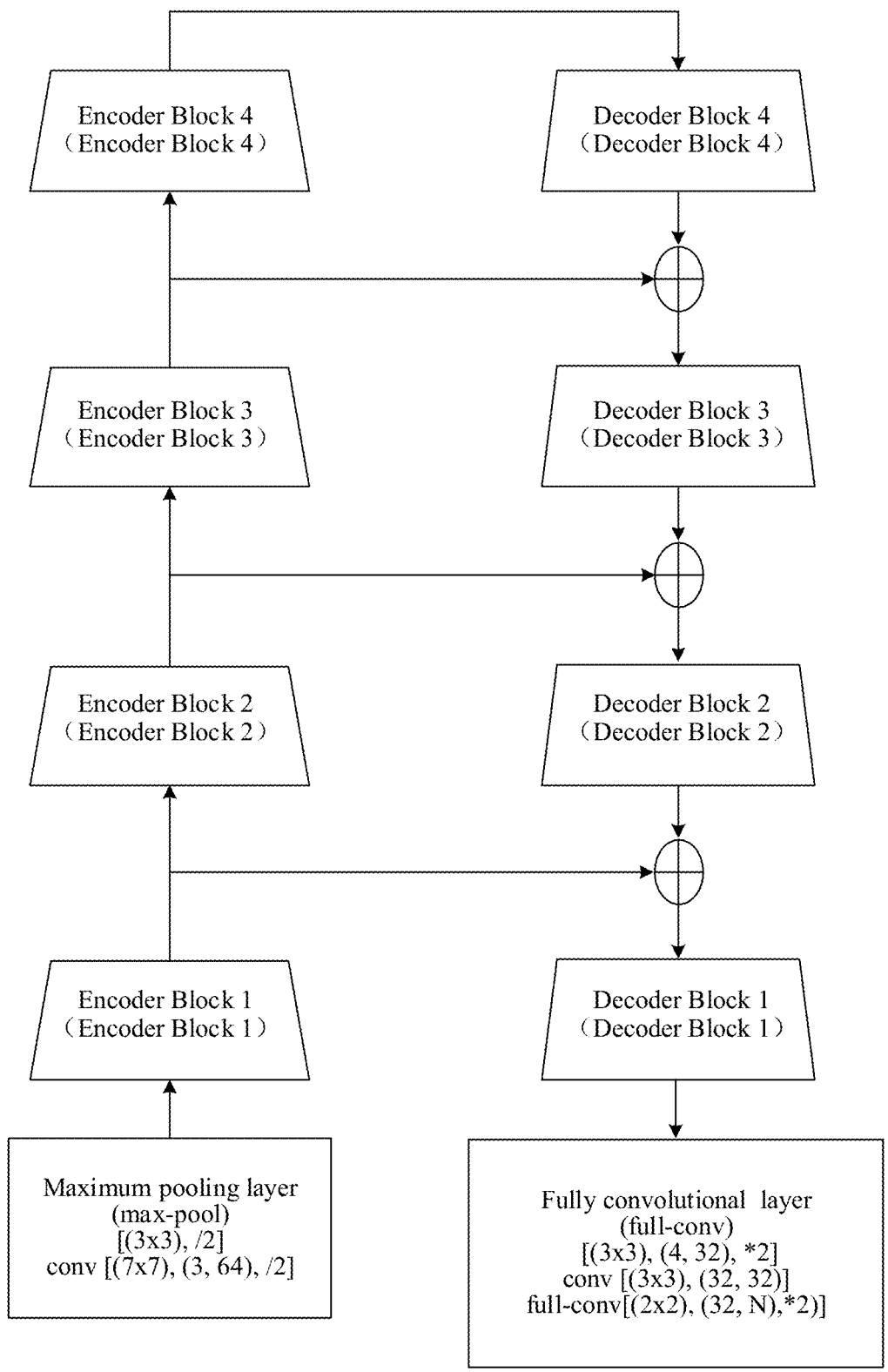
FIG. 11 is a structural schematic diagram of a network for an image processing model provided by embodiments of this application.

FIG. 10 is a schematic diagram of correction for microscope images of cell slides of an HER2 in embodiments of this application. The microscope images 1001 of the cell slides of the HER2 after correction is clearer than the microscope images 1002 of the cell slides of the HER2 before correction, the correction network of the image processing model being U-Net or LinkNet. Taking LinkNet as an example, FIG. 11 is a structural schematic diagram of a network for an image processing model provided by embodiments of this application. A mean square error is adopted in a loss function; an Adam is taken as an optimization method; and a learning rate is set to 0.001. In a LinkNet structure, each encoder block is connected with a decoder block; and meanwhile, the network structure further includes a maximum pooling layer and a fully convolutional layer. As shown in FIG. 11, a microscope image to be subjected to the light field correction is inputted into a network structure; an inputted target detection object image (e.g., an inputted image of each encoder block) is firstly encoded and compressed by an encoder block to obtain low-level semantic feature information with a lower dimension, such as color and brightness. A decoder block is connected with the encoder block; the low-level semantic feature information outputted by the encoder block is inputted to the decoder block; the decoder block performs a decoding operation on the low-level semantic feature information, and outputs a feature object segmentation image with the same size as the original size of the target detection object image; and in the feature object segmentation image, a white region is a region accommodating cells, and a black region is a light spot generated by uniform distribution of light fields. An input of the encoder block is connected with an output of a corresponding decoder block in the LinkNet structure; and the encoder block may merge the low-level semantic feature information into the decoder block before the decoder block outputs the feature object segmentation image, so that the decoder block integrates the low-level semantic feature information and the high-level semantic feature information, and spatial information lost during the down-sampling operation may be effectively reduced; and the decoder block shares the parameters learned from each layer of the encoder block, so as to effectively reduce the parameters of the decoder block.

Since variation of a light field variation is gradual, a smoothness constraint may be added to the light field. The smoothness constraint may be implemented by controlling a difference between adjacent pixels of the background light field to be minimized. For example: when variations of light fields corresponding to all pixels are consistent (constant), the difference is 0, and the light field is smoothest. When adjacent pixels are subjected to abrupt variation, the difference is too large, and the light field is unsmooth. Therefore, the smoothness of an output light field may be controlled by difference minimization constraint. The smoothness may be controlled by a factor c, c being set to an empirical value of 0.01.

Step 804: Acquire any microscope image of a cell slide of an HER2 collected by a microscope, and determine corresponding light field information through the image processing model.

Step 805: Perform light field correction processing on the microscope image of the cell slide of the HER2 based on the acquired light field information.

Step 806: Show a microscope image subjected to the light field correction processing of the cell slide of the HER2 in a user interface of a medical device.

Figure 12:
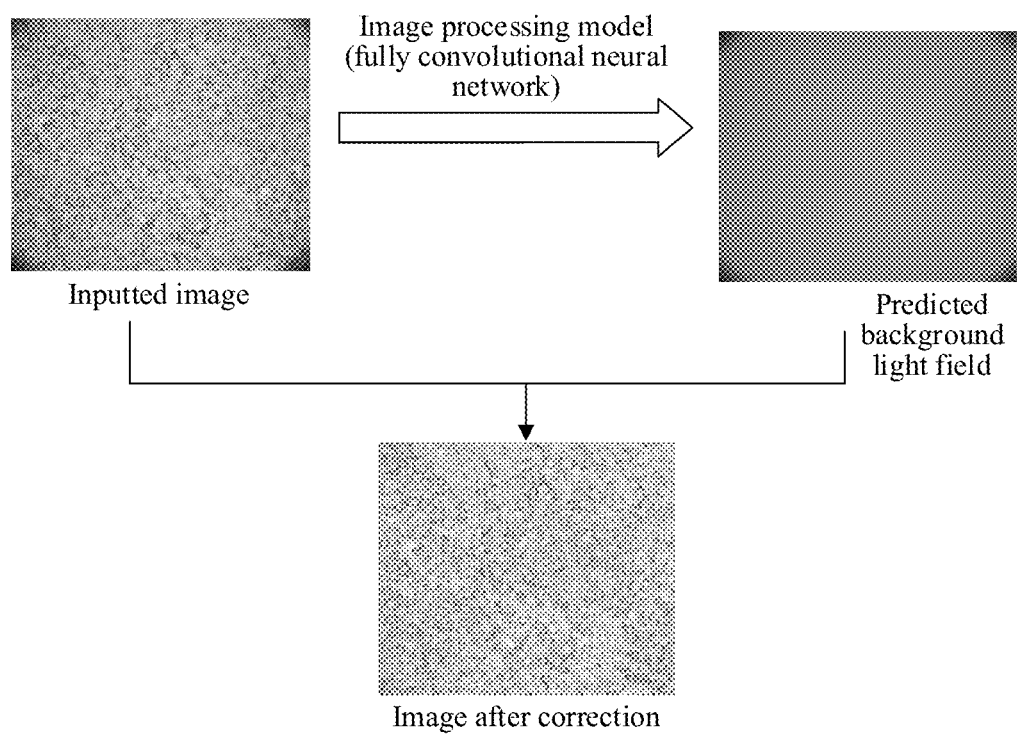
FIG. 12 is a schematic diagram of showing a microscope image subjected to light field correction through a display interface in embodiments of this application.

Referring to FIG. 12, FIG. 12 is a schematic diagram of showing a microscope image subjected to light field correction through a display interface in embodiments of this application. Therefore, only one microscope image of the cell slide of the HER2 needs to be acquired, an image processing model may be trained and used; the background light field of the microscope image of the cell slide of the HER2 in different light field environments may be predicted; images with un-uniform brightness may be corrected very well; and excessively dark images may also be recovered to have corresponding brightness.

In conclusion, embodiments of this application have the following beneficial effects: a corresponding light field background may be predicted by an image processing model; and meanwhile, at a stage of testing and using the image processing model, the trained image processing model only needs to acquire an image to complete the prediction for the light field background, and may complete the correction for the image light field based on the predicted light field background. As a result, the light field correction is accelerated.

Understandably, user data related to images and the like are related to embodiments of this application. In the case that embodiments of this application are applied to a specific product or technology, user permission or consent needs to be acquired; and collection, use and processing of relevant data need to comply with relevant laws and regulations and standards of relevant countries and regions.

In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

The foregoing descriptions are merely preferred embodiments of this application, but are not intended to limit this application. Any modification, equivalent replacement and improvement made within the spirit and principle of this application shall fall within the protection scope of this application.

What is claimed is:

1. A medical image processing method based on an image processing model, applied to an electronic device, the method comprising:
acquiring a standard image matched with an image processing model;
determining light field variation parameters corresponding to a use environment of the image processing model based on the standard image and a real image matched with the standard image, the standard image having a nonuniform light field and the real image having a uniform light field, further comprising:
determining a mapping relationship between pixels of the standard image and pixels of the real image; and
determining the light field variation parameters corresponding to the use environment of the image processing model based on the mapping relationship;
determining an image training sample set matched with the use environment of the image processing model based on the light field variation parameters, the image training sample set comprising images of different light field backgrounds, comprising:
determining a light field brightness variation range according to the use environment of the image processing model;
performing simulation processing on the standard image based on light field variation parameters randomly selected within the light field brightness variation range and the light field variation parameters to obtain a plurality of simulated images and light field images corresponding to the simulated image; and
taking the plurality of simulated images and the corresponding light field images matched with the simulated images as the image training sample set;
training a correction network of the image processing model through the image training sample set to obtain a model updating parameter adapted to the correction network, and generating a trained image processing model based on the model updating parameter;
acquiring only a single image in the use environment, and performing prediction processing on the single image through the trained image processing model to obtain light field information corresponding to the single image; and
correcting a light field of the single image based on the predicted light field information corresponding to the single image.

2. The method according to claim 1, wherein the method further comprises:
determining a target smoothness parameter based on the use environment of the image processing model; and
performing smoothness adjustment processing on the simulated image according to the target smoothness parameter to obtain an adjusted simulated image, a smoothness of the adjusted simulated image being adapted to the use environment of the image processing model.

3. The method according to claim 1, wherein training the correction network of the image processing model comprises:
determining initial parameters of an encoder block and a decoder block of the correction network in the image processing model;
performing back-propagation processing based on the initial parameters and the image training sample set to obtain updated parameters of the encoder block and the decoder block of the correction network; and
iteratively updating, based on the updated parameters of the encoder block and the decoder block of the correction network, parameters of the encoder block and the decoder block of the correction network with the image training sample set, to obtain the model updating parameter adapted to the correction network.

4. The method according to claim 3, wherein performing back-propagation processing comprises:
substituting a training sample from the image training sample set into a loss function corresponding to the encoder block and the decoder block of the correction network; and
performing back-propagation processing based on the loss function to obtain the updated parameters corresponding to the encoder block and the decoder block of the correction network.

5. The method according to claim 1, further comprising:
performing noise reduction processing on the image through an image preprocessing network of the image processing model to obtain a noise-reduced image;
performing down-sampling processing on the noise-reduced image through a convolutional layer and a maximum value pooling layer in the image preprocessing network to obtain a down-sampled image;
performing normalization processing on the down-sampled image through a fully connected layer of the image preprocessing network to obtain a normalized image; and
performing deep decomposition processing on the normalized image through the image preprocessing network to obtain a light field feature vector matched with the image.

6. The method according to claim 5, wherein performing noise reduction processing on the image comprises:
determining, based on a position of a target region corresponding to the image, a dynamic noise threshold matched with the use environment of the image processing model; and
performing noise reduction processing on the image based on the dynamic noise threshold to obtain an image matched with the dynamic noise threshold.

7. The method according to claim 5, wherein performing noise reduction processing on the image through an image preprocessing network of the image processing model comprises:
determining, based on an image type of the imaging image, a fixed noise threshold matched with the use environment of the image processing model; and
performing noise reduction processing on the image based on the fixed noise threshold to obtain an image matched with the fixed noise threshold.

8. The method according to claim 1, wherein acquiring only the single image in the use environment comprises:
in accordance with a determination that the use environment of the image processing model includes capturing an image with a microscope, setting an original image collected by the microscope as the single image.

9. The method according to claim 1, further comprising:
transmitting a model identifier of the trained image processing model, the single image in the use environment and the single image subjected to light field correction to a block chain network;

filling a node of the block chain network with the model identifier of the trained image processing model, the single image in the use environment and the single image subjected to optical field correction into a new block; and in accordance with a determination that an agreement is reached for the new block, appending the new block to a tail part of the block chain.

10. An electronic device, comprising:

one or more processors; and memory storing one or more programs, the one or more programs comprising instructions that, when executed by the one or more processors, cause the one or more processors to perform operations comprising:

acquiring a standard image matched with an image processing model;

determining light field variation parameters corresponding to a use environment of the image processing model based on the standard image and a real image matched with the standard image, the standard image having a nonuniform light field and the real image having a uniform light field, further comprising:

determining a mapping relationship between pixels of the standard image and pixels of the real image; and determining the light field variation parameters corresponding to the use environment of the image processing model based on the mapping relationship;

determining an image training sample set matched with the use environment of the image processing model based on the light field variation parameters, the image training sample set comprising images of different light field backgrounds, comprising:

determining a light field brightness variation range according to the use environment of the image processing model;

performing simulation processing on the standard image based on light field variation parameters randomly selected within the light field brightness variation range and the light field variation parameters to obtain a plurality of simulated images and light field images corresponding to the simulated image; and taking the plurality of simulated images and the corresponding light field images matched with the simulated images as the image training sample set;

training a correction network of the image processing model through the image training sample set to obtain a model updating parameter adapted to the correction network, and generating a trained image processing model based on the model updating parameter;

acquiring only a single image in the use environment, and performing prediction processing on the single image through the trained image processing model to obtain light field information corresponding to the single image; and correcting a light field of the single image based on the predicted light field information corresponding to the single image.

11. The electronic device according to claim 10, wherein the instructions cause the one or more processors to perform operations that further comprise:

determining a target smoothness parameter based on the use environment of the image processing model; and performing smoothness adjustment processing on the simulated image according to the target smoothness parameter to obtain an adjusted simulated image, a smoothness of the adjusted simulated image being adapted to the use environment of the image processing model.

12. The electronic device according to claim 10, wherein training the correction network of the image processing model comprises:

determining initial parameters of an encoder block and a decoder block of the correction network in the image processing model;

performing back-propagation processing based on the initial parameters and the image training sample set to obtain updated parameters of the encoder block and the decoder block of the correction network; and iteratively updating, based on the updated parameters of the encoder block and the decoder block of the correction network, parameters of the encoder block and the decoder block of the correction network with the image training sample set, to obtain the model updating parameter adapted to the correction network.

13. The electronic device according to claim 12, wherein performing back-propagation processing comprises:

substituting a training sample from the image training sample set into a loss function corresponding to the encoder block and the decoder block of the correction network; and performing back-propagation processing based on the loss function to obtain the updated parameters corresponding to the encoder block and the decoder block of the correction network.

14. A non-transitory computer-readable storage medium, storing a computer program, the computer program, when executed by one or more processors of an electronic device, cause the one or more processors to perform operations comprising:

acquiring a standard image matched with an image processing model;

determining light field variation parameters corresponding to a use environment of the image processing model based on the standard image and a real image matched with the standard image, the standard image having a nonuniform light field and the real image having a uniform light field, further comprising:

determining a mapping relationship between pixels of the standard image and pixels of the real image; and determining the light field variation parameters corresponding to the use environment of the image processing model based on the mapping relationship;

determining an image training sample set matched with the use environment of the image processing model based on the light field variation parameters, the image training sample set comprising images of different light field backgrounds, comprising:

determining a light field brightness variation range according to the use environment of the image processing model;

performing simulation processing on the standard image based on light field variation parameters randomly selected within the light field brightness variation range and the light field variation parameters to obtain a plurality of simulated images and light field images corresponding to the simulated image; and taking the plurality of simulated images and the corresponding light field images matched with the simulated images as the image training sample set;

training a correction network of the image processing model through the image training sample set to obtain a model updating parameter adapted to the correction network, and generating a trained image processing model based on the model updating parameter;

acquiring only a single image in the use environment, and performing prediction processing on the single image through the trained image processing model to obtain light field information corresponding to the single image; and correcting a light field of the single image based on the predicted light field information corresponding to the single image.

15. The non-transitory computer-readable storage medium according to claim 14, wherein the method further comprises:
   determining a target smoothness parameter based on the use environment of the image processing model; and
   performing smoothness adjustment processing on the simulated image according to the target smoothness parameter to obtain an adjusted simulated image, a smoothness of the adjusted simulated image being adapted to the use environment of the image processing model.

16. The non-transitory computer-readable storage medium according to claim 14, wherein training the correction network of the image processing model comprises:
   determining initial parameters of an encoder block and a decoder block of the correction network in the image processing model;
   performing back-propagation processing based on the initial parameters and the image training sample set to obtain updated parameters of the encoder block and the decoder block of the correction network; and
   iteratively updating, based on the updated parameters of the encoder block and the decoder block of the correction network, parameters of the encoder block and the decoder block of the correction network with the image training sample set, to obtain the model updating parameter adapted to the correction network.

17. The non-transitory computer-readable storage medium according to claim 16, wherein performing back-propagation processing comprises:

substituting a training sample from the image training sample set into a loss function corresponding to the encoder block and the decoder block of the correction network; and performing back-propagation processing based on the loss function to obtain the updated parameters corresponding to the encoder block and the decoder block of the correction network.

18. The non-transitory computer-readable storage medium according to claim 14, wherein the method further comprises:
   transmitting a model identifier of the trained image processing model, the single image in the use environment and the single image subjected to light field correction to a block chain network;
   filling a node of the block chain network with the model identifier of the trained image processing model, the single image in the use environment and the single image subjected to optical field correction into a new block; and
   in accordance with a determination that an agreement is reached for the new block, appending the new block to a tail part of the block chain.

19. The electronic device according to claim 10, wherein the method further comprises:
   transmitting a model identifier of the trained image processing model, the single image in the use environment and the single image subjected to light field correction to a block chain network;
   filling a node of the block chain network with the model identifier of the trained image processing model, the single image in the use environment and the single image subjected to optical field correction into a new block; and
   in accordance with a determination that an agreement is reached for the new block, appending the new block to a tail part of the block chain.

* * * * *